United States Patent
Hirao (10) Patent No.: US 10,302,145 B2
(45) Date of Patent: May 28, 2019

(54) ASSEMBLY HAVING A CLUTCH COLLAR AND METHOD OF MANUFACTURE

(71) Applicant: ArvinMeritor Technology, LLC, Troy, MI (US)

(72) Inventor: Wagner Yukio Hirao, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 77 days.

(21) Appl. No.: 15/471,541

(22) Filed: Mar. 28, 2017

(65) Prior Publication Data

US 2018/0283465 A1    Oct. 4, 2018

(51) Int. Cl.
| | | |
|---|---|---|
| *F16D 11/14* | (2006.01) | |
| *B23F 15/06* | (2006.01) | |
| *F16D 1/10* | (2006.01) | |
| *F16H 48/24* | (2006.01) | |
| *F16H 48/08* | (2006.01) | |
| *B60K 17/16* | (2006.01) | |
| *F16D 11/00* | (2006.01) | |

(52) U.S. Cl.
CPC .............. *F16D 11/14* (2013.01); *B23F 15/06* (2013.01); *F16D 1/10* (2013.01); *B60K 17/165* (2013.01); *F16D 2001/103* (2013.01); *F16D 2011/008* (2013.01); *F16H 48/08* (2013.01); *F16H 48/24* (2013.01)

(58) Field of Classification Search
CPC .................................................. F16D 2011/006
See application file for complete search history.

(56) References Cited

U.S. PATENT DOCUMENTS

| | | | |
|---|---|---|---|
| 2,429,284 A | | 10/1947 | Wildhaber |
| 2,558,203 A | * | 6/1951 | Wildhaber ............... F16D 11/14 192/108 |
| 3,184,988 A | * | 5/1965 | Osplack .................. B23F 15/06 74/457 |
| 4,318,702 A | * | 3/1982 | Stacey .................... B63H 23/08 440/75 |
| 4,452,331 A | | 6/1984 | Lunn et al. |
| 5,370,018 A | | 12/1994 | Kwasniewski |
| 5,765,671 A | * | 6/1998 | Endo ................... B60L 11/1874 192/48.2 |
| 6,581,745 B2 | | 6/2003 | Kanazawa |
| 7,749,124 B2 | | 7/2010 | Nakajima |

(Continued)

FOREIGN PATENT DOCUMENTS

| | | |
|---|---|---|
| AT | 211118 B | 9/1960 |
| CN | 101666375 A | 3/2010 |

(Continued)

OTHER PUBLICATIONS

Curvic Coupling Design, Gear Technology, Gleason Works, Rochester, New York, Nov./Dec. 1986.

(Continued)

*Primary Examiner* — Mark A Manley
(74) *Attorney, Agent, or Firm* — Brooks Kushman P.C.

(57) ABSTRACT

An assembly having a clutch collar, a clutch collar, and a method of manufacturing a clutch collar. The clutch collar may have clutch collar teeth that are continuously curved in a direction that extends away from an axis. A dovetail profile may be provided with the clutch collar teeth.

17 Claims, 7 Drawing Sheets

(56) References Cited

U.S. PATENT DOCUMENTS

| | | | |
|---|---|---|---|
| 2003/0086769 A1* | 5/2003 | Hyatt | B23F 9/00 |
| | | | 409/76 |
| 2014/0190781 A1 | 7/2014 | Lawson et al. | |
| 2016/0053822 A1* | 2/2016 | Nefacy | B60K 17/02 |
| | | | 192/71 |
| 2016/0341260 A1 | 11/2016 | Hirao | |

FOREIGN PATENT DOCUMENTS

| | | |
|---|---|---|
| DE | 102004020863 A1 | 12/2004 |
| DE | 102009038292 A1 | 8/2010 |
| EP | 0598234 A1 | 5/1994 |
| EP | 3095634 A2 | 11/2016 |
| GB | 334649 A | 9/1930 |
| GB | 1493551 A | 11/1977 |
| WO | 2004009392 A1 | 1/2004 |

OTHER PUBLICATIONS

European Patent Office, Extended European Search Report for Application No. EP18158785.8-1012, dated Sep. 11, 2018.

\* cited by examiner

ASSEMBLY HAVING A CLUTCH COLLAR AND METHOD OF MANUFACTURE

TECHNICAL FIELD

This disclosure relates to a clutch collar, an assembly having a clutch collar, and a method of manufacturing a clutch collar.

BACKGROUND

An axle assembly having a clutch collar is disclosed in United States Patent Publication No. 2016/0341260.

SUMMARY

In at least one embodiment, a clutch collar is provided. The clutch collar may have an outer surface, an inner surface, a clutch collar face gear, and an annular groove. The outer surface may extend around the axis. The inner surface may be disposed opposite the outer surface. The clutch collar face gear may have a tooth that may extend from the inner surface to the outer surface. The tooth may have a first flank and a second flank that may be disposed opposite the first flank. The first flank and the second flank may be continuously curved in a direction that extends from the inner surface to the outer surface. The annular groove may be spaced apart from the clutch collar face gear and may extend from the outer surface toward the axis. The tooth may have a dovetail profile in which the first flank and second flank may become progressively further apart in an axial direction that extends away from the annular groove.

In at least one embodiment, a drivetrain assembly is provided. The drivetrain assembly may have a shaft, a gear, and a clutch collar. The shaft may have a spline and may be rotatable about an axis. The gear may receive the shaft and may be rotatable about the axis with respect to the shaft. The gear may have a face gear that may have a set of teeth that may be arranged around the axis. Each member of the set of teeth may have a first flank and a second flank that may be continuously curved in a direction that extends away from the axis. The clutch collar may be movably disposed on the shaft. The clutch collar may have a clutch collar hole, a clutch collar spline, and a clutch collar face gear. The clutch collar hole may receive the shaft. The clutch collar spline may be disposed in the clutch collar hole. The clutch collar spline may mate with the spline of the shaft to inhibit rotation of the clutch collar with respect to the shaft. The clutch collar face gear may have a set of clutch collar teeth. Each member of the set of clutch collar teeth may have a first flank and a second flank that may be continuously curved in a direction that extends away from the axis. The set of teeth of the gear may have a first dovetail profile in which the first flank and the second flank may become progressively further apart in an axial direction that extends toward the clutch collar. The set of clutch collar teeth may have a second dovetail profile in which the first flank and the second flank may become progressively further apart in an axial direction that extends toward the gear.

In at least one embodiment, a method of manufacturing a clutch collar is provided. The method may include providing an annular clutch collar body that has a tip surface that extends around a clutch collar hole. A first cutting tool may remove material from discrete locations on the tip surface where gaps between adjacent clutch collar gear teeth are to be provided. A second cutting tool may remove material to increase the gap between adjacent clutch collar teeth. The first cutting tool may form a first connecting surface of the first tooth and a second connecting surface of a second tooth. The second cutting tool may form a first flank of the first tooth, a second flank of the second tooth, and a root surface that extends from the first flank to the second flank. The first flank may extend from the first connecting surface to the root surface. The second flank may extend from the second connecting surface to the root surface. The first flank, root surface, and second flank may cooperate to define a dovetail opening between the first tooth and the second tooth.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
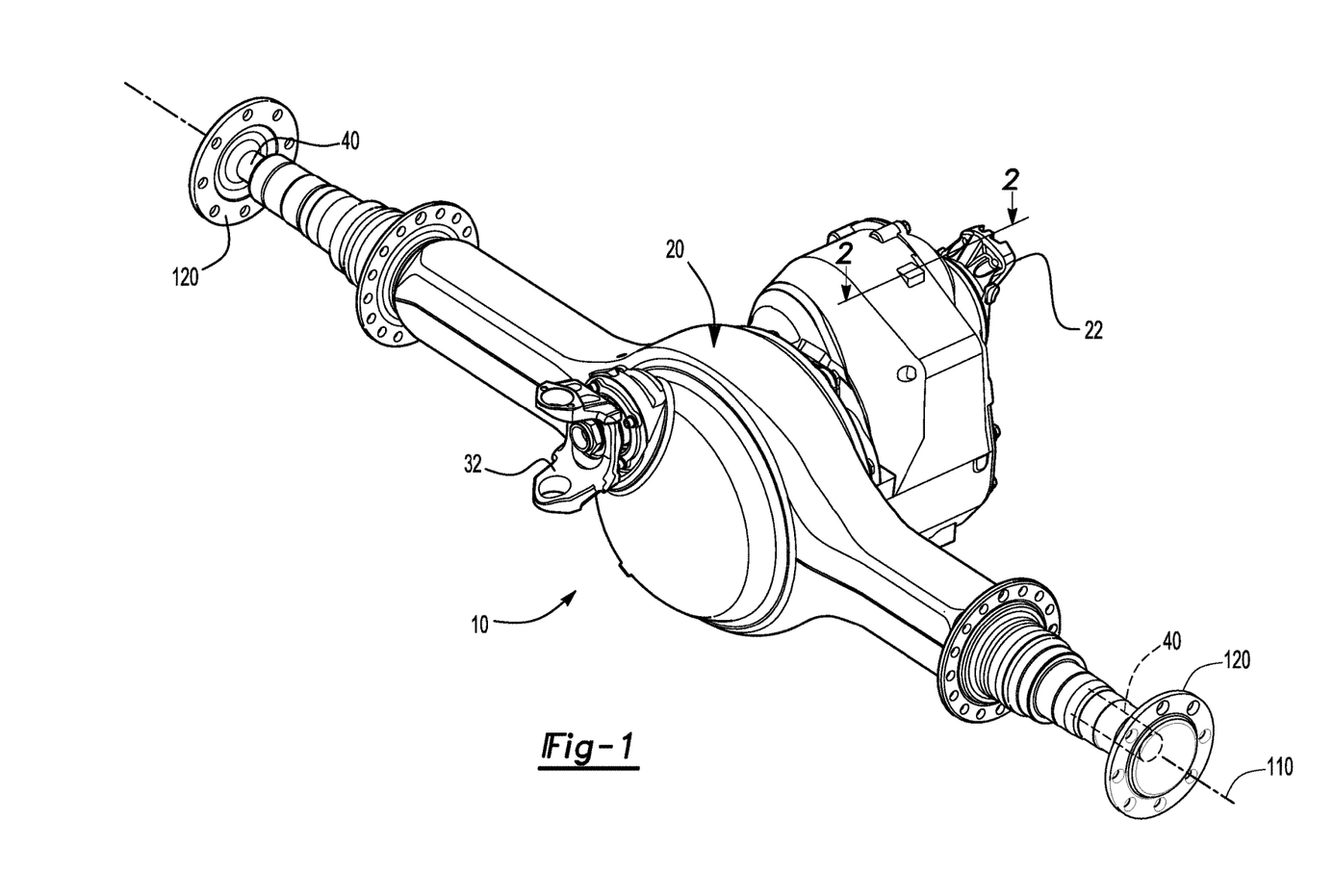
FIG. 1 is a perspective view of a drivetrain assembly configured as an axle assembly.

Referring to FIG. 1, an example of a drivetrain assembly 10 is shown. In FIG. 1, the drivetrain assembly 10 is depicted as an axle assembly; however, the drivetrain assembly may also be configured as a transfer case or wheel hub assembly. The drivetrain assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The drivetrain assembly 10 may be part of a vehicle drivetrain that may provide torque to one or more traction wheel assemblies that may include a tire mounted on a wheel. One or more drivetrain assemblies 10 may be provided with the vehicle. For example, a drivetrain assembly 10 configured as an axle assembly may be a single drive axle assembly or may be configured as part of a tandem axle configuration or multi-axle configuration that may include a plurality of axle assemblies that may be connected in series. For clarity, the drivetrain assembly 10 is primarily depicted and described as being an axle assembly.

Figure 2:
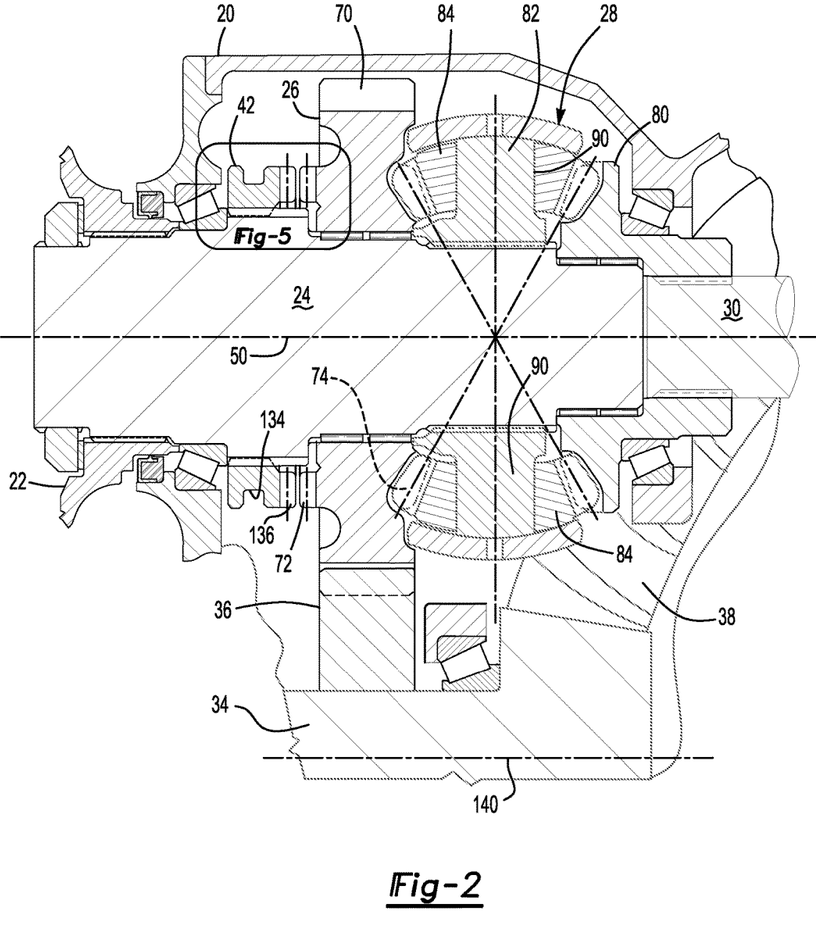
FIG. 2 is a section view of a portion of the drivetrain assembly along section line 2-2.

Referring to FIGS. 1 and 2, the axle assembly may include a housing 20, an input yoke 22, an input shaft 24, a drive gear 26, an interaxle differential unit 28, an output shaft 30, an output yoke 32, a pinion 34, a driven gear 36, a ring gear 38, one or more axle shafts 40, and a clutch collar 42. These components are shown to facilitate an abbreviated discussion of the operation of the axle assembly.

The housing 20 may receive various components of the axle assembly. In addition, the housing 20 may facilitate mounting of the axle assembly to the vehicle.

The input yoke 22 may facilitate coupling of the axle assembly to a torque source. For example, the input yoke 22 may be coupled to a drive shaft that may be operatively connected to a transmission. Alternatively, the input yoke 22 may be coupled to a connection shaft or prop shaft that may be coupled to an output yoke of another axle assembly or a transfer case. The input yoke 22 may be disposed on the input shaft 24.

The input shaft 24 may extend along and may be rotatable about an axis 50. For example, the input shaft 24 may be rotatably supported by one or more roller bearings that may be disposed on the housing 20. The input shaft 24 may be operatively connected to the interaxle differential unit 28, which may be provided when the axle assembly provides torque to another axle assembly. As is best shown in FIG. 3, the input shaft 24 may include a spline 60.

The spline 60 may include a set of spline teeth that may be arranged around the axis 50. The spline teeth may primarily extend in an axial direction or in same direction as the axis 50. The spline teeth may be spaced apart from each other such that a gap is provided between adjacent spline teeth. The gap may receive a spline tooth on the clutch collar 42 as will be discussed in more detail below.

Figure 3:
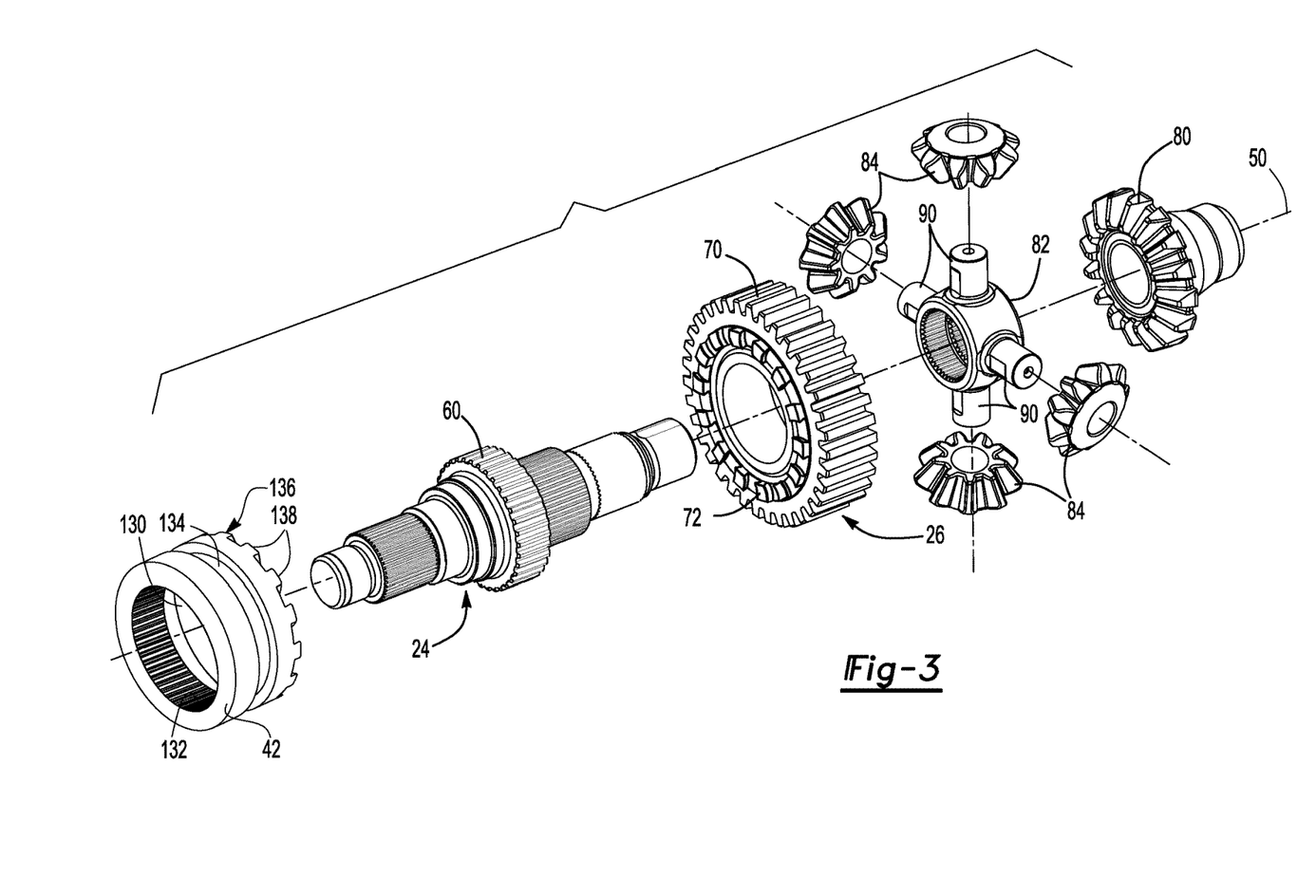
FIG. 3 is an exploded view of a portion of the drivetrain assembly including a shaft, a clutch collar, and an interaxle differential unit.

Referring to FIGS. 2 and 3, the drive gear 26 may receive the input shaft 24. In at least one configuration, the drive gear 26 may have a center bore that may receive the input shaft 24 and a bearing that may receive the input shaft 24 and that may rotatably support the drive gear 26. The bearing, if provided, may allow the drive gear 26 to rotate about or with respect to the input shaft 24 under certain operating conditions. The drive gear 26 may include an outer gear 70, a face gear 72, and an internal gear 74.

The outer gear 70 may include a plurality of teeth that may engage and may mesh with teeth on the driven gear 36. For example, the teeth may be arranged around an outside diameter of the drive gear 26.

The face gear 72 may include a set of teeth 76 that may be arranged on a side or face of the drive gear 26 that may face away from the interaxle differential unit 28 and toward the clutch collar 42. The teeth 76 of the face gear 72 may selectively engage teeth on the clutch collar 42 as will be discussed in more detail below. The teeth 76 of the face gear 72 may have the same configuration or similar configuration as the teeth of the clutch collar 42. As such, a more detailed discussion of the configuration of the teeth 76 of the face gear 72 will be presented below. As an overview, the teeth 76 of the face gear 72 may have a spiral configuration and may have a dovetail profile in which the teeth become wider in an axial direction that extends toward the clutch collar 42. The dovetail configuration of the teeth 76 of the face gear 72 may interlock with the dovetail configuration of the teeth of the clutch collar to provide a negative pressure angle that helps keep the clutch collar 42 engaged with the face gear 72 when torque is provided.

The internal gear 74 may be disposed on an opposite side of the drive gear 26 from the face gear 72. The internal gear 74 may include a set of teeth that may be arranged on a side or face of the drive gear 26 that faces toward the interaxle differential unit 28. The teeth of the internal gear 74 may have a different configuration from the teeth of the face gear 72. For example, the teeth of the internal gear 74 may have straight teeth that may extend radially away from the axis 50 and that may not have a dovetail configuration.

The interaxle differential unit 28 may compensate for speed differences between different drive axle assemblies, such as speed differences between the axle assembly and the second axle assembly. The interaxle differential unit 28 may be provided in various locations. In FIG. 2, the interaxle differential unit 28 is disposed on the input shaft 24 adjacent to the drive gear 26; however, it is contemplated that the interaxle differential unit 28 may be provided in other locations, such as closer to the output yoke 32, and that the interaxle differential unit 28 may be disposed on a shaft other than the input shaft 24.

Referring to FIGS. 2 and 3, an exemplary interaxle differential unit configuration is shown that may include an output gear 80, a spider 82, and a plurality of pinion gears 84. It is to be understood that other interaxle differential unit configurations may be provided that may be compatible with the tapered spline arrangements discussed below.

The output gear 80 may be disposed proximate the input shaft 24. For example, the output gear 80 may extend along the axis 50 and may have a center bore that may receive and/or support an end of the input shaft 24. A bearing may be provided in the center bore between the input shaft 24 and output gear 80 to facilitate alignment and rotation. The center bore may also include a spline or splined portion that may be spaced apart from the input shaft 24 and that may receive and engage a corresponding spline on another shaft, such as the output shaft 30. As such, the output gear 80 may not rotate about the axis 50 with respect to the output shaft 30.

The spider 82 may be fixedly disposed on the input shaft 24. For instance, the spider 82 may include a center bore that may include splines that may mate with corresponding splines on the input shaft 24 to help align and secure the spider 82 to the input shaft 24. As such, the spider 82 may rotate about the axis 50 with the input shaft 24. The spider 82 may also include one or more pins 90 that may extend away from the center bore of the spider 82.

The pinion gear 84 may be rotatably disposed on the pin 90. The pinion gear 84 may include teeth that may mate with the internal gear 74 of the drive gear 26 and may mate with teeth on the output gear 80.

Referring to FIG. 2, the output shaft 30 may extend along and may be rotatable about the axis 50. For instance, the output shaft 30 may be supported by one or more bearings that may be disposed on the housing 20. The output shaft 30 may be coupled to the interaxle differential unit 28. For example, the output shaft 30 may be fixedly coupled to the output gear 80.

Referring to FIG. 1, the output yoke 32 may facilitate coupling of the axle assembly to a prop shaft. The output yoke 32 may be coupled to the prop shaft in any suitable manner, such as with a universal joint. The output yoke 32 may be fixedly coupled to the output shaft 30.

Referring to FIG. 2, the pinion 34 may be spaced apart from the input shaft 24 and may be rotatable about a second axis 100. The pinion 34 may rotate with the driven gear 36. A pinion gear may be disposed at an end of the pinion 34. The pinion gear may include a set of teeth that mate with corresponding teeth on the ring gear 38.

The driven gear 36 may be disposed proximate the pinion 34. For example, the pinion 34 may be received in a center bore of the driven gear 36 and the driven gear 36 may be fixedly disposed on and may rotate about the second axis 100 with the pinion 34. The driven gear 36 may include a plurality of teeth that may be generally arranged about an outside diameter of the driven gear 36 that mate with the outer gear 70 of the drive gear 26.

The ring gear 38 may be rotatable about a third axis 110, which is best shown in FIG. 1, and may be coupled to an axle shaft 40 of the axle assembly. The ring gear 38 may be mounted to or may be operatively connected to a differential or differential unit. The differential may be generally disposed inside the ring gear 38 and may be configured to permit the axle shafts 40 to rotate at different speeds. Torque may be transmitted from the ring gear 38 to the differential and the differential may provide torque to the axle shafts 40.

Referring to FIG. 1, the axle shafts 40 may extend along and may be rotated about the third axis 110 by the differential. Each axle shaft 40 may have a first end and a second end. The first end may be operatively connected to the differential. The second end may be disposed opposite the first end and may be operatively connected to a wheel end assembly that may have a wheel hub that may support a wheel. As shown in FIG. 1, an axle flange 120 may be disposed proximate the second end of each axle shaft 40 and may facilitate coupling of the axle shaft 40 to the wheel hub.

Figure 4:
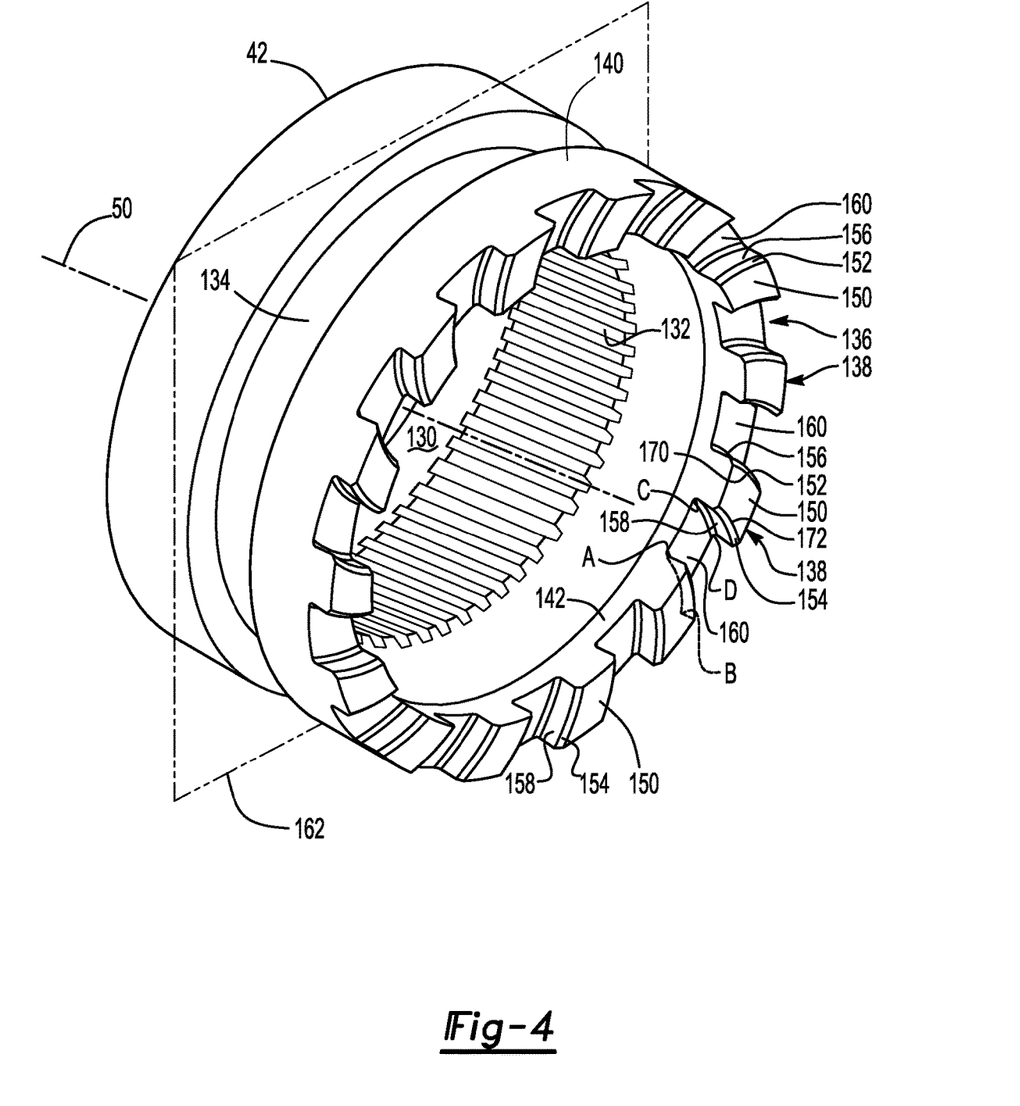
FIG. 4 is a perspective view of the clutch collar.

Referring to FIGS. 2-4, the clutch collar 42, which may also be referred to as a lock collar, may be moveably disposed on a shaft. The clutch collar 42 may move axially or move along the axis 50 between a disengaged position and an engaged position as will be discussed in more detail below. The clutch collar 42 is shown as being disposed on the input shaft 24 in FIGS. 2 and 3 as one example of where the clutch collar 42 may be located. It is to be understood that the clutch collar 42 may also be disposed elsewhere on the input shaft 24 or on another shaft, such as the output shaft 30, axle shaft 40, or the shaft of a pinion. Moreover, the face gear that is engaged or disengaged by the clutch collar 42 may be provided with a component or gear other than the drive gear 26. For instance, the face gear may be provided with the driven gear 36, a side gear or case of the interaxle differential unit 28 or the differential, or interface between rotatable shafts or rotatable gear and a rotatable shaft. The clutch collar 42 may be generally ring-shaped and may include a clutch collar hole 130, a clutch collar spline 132, an annular groove 134, and a clutch collar face gear 136.

The clutch collar hole 130 may be a through hole that may extend through the clutch collar 42. The clutch collar hole 130 may be centered about the axis 50. In addition, the clutch collar hole 130 may receive a shaft, such as the input shaft 24 or the output shaft 30. The clutch collar hole 130 may receive a shaft, such as the input shaft 24.

The clutch collar spline 132 may be disposed in the clutch collar hole 130. The clutch collar spline 132 may include a set of clutch collar spline teeth. The clutch collar spline teeth may be arranged around the axis 50 and may extend toward the axis 50. The clutch collar spline teeth may be spaced apart from each other such that a gap is provided between adjacent clutch collar spline teeth. The clutch collar spline 132 may mate with a corresponding spine on a shaft, such as the spline 60 of the input shaft 24, to inhibit rotation of the clutch collar 42 with respect to the shaft.

The annular groove 134 may be disposed opposite the clutch collar hole 130. For example, the annular groove 134 may extend continuously around the clutch collar 42 and may extend from an outer surface 140 of the clutch collar 42 toward the axis 50. The outer surface 140 may be an outside circumferential surface of the clutch collar 42 that may extend around the axis 50 and may face away from the axis 50. The annular groove 134 may be spaced apart from the clutch collar face gear 136 and may be axially positioned between the clutch collar face gear 136 and a side of the clutch collar 42 that is disposed opposite the clutch collar face gear 136. The annular groove 134 may receive a linkage, such as a fork, that may operatively connect the clutch collar 42 to an actuator that may actuate and position the clutch collar 42 along the input shaft 24.

The clutch collar face gear 136 may face toward the drive gear 26. The clutch collar face gear 136 may include a set of clutch collar teeth 138 that may be arranged around the axis 50. As is best shown in FIG. 4, the clutch collar teeth 138 may extend from the outer surface 140 to an inner surface 142 that may be disposed opposite the outer surface 140. The inner surface 142 may be an inside circumferential surface of the clutch collar 42 that may face toward the axis 50. The inner surface 142 may be spaced apart from the clutch collar hole 130 and may be disposed at a greater radial distance from the axis 50 than the clutch collar hole 130. The outer surface 140 may also be disposed at a greater radial distance from the axis 50 than the inner surface 142.

The teeth 138 of the clutch collar face gear 136 may have a spiral configuration when viewed along the axis 50 and may have a dovetail configuration or dovetail profile when viewed perpendicular to the axis 50 or when viewed as a cross sectional tooth profile in a direction that extends away from the axis 50. Each tooth 138 may have a tip 150, a first connecting surface 152, a second connecting surface 154, a first flank 156, and a second flank 158. In addition, a root surface 160 may extend between adjacent teeth 138 of the clutch collar face gear 136.

Figure 9:
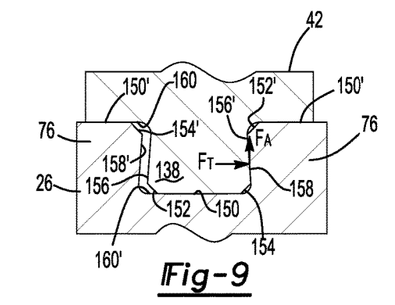
FIGS. 9 and 10 are section views showing the clutch collar in the engaged and partially engaged positions.

Referring to FIGS. 4 and 9, the tip 150 may extend in a radial direction from the inner surface 142 to the outer surface 140. The tip 150 may also extend from a first end 170 to a second end 172 of the tip 150. The first end 170 may be a line or edge that may extend along an arc from the inner surface 142 to the outer surface 140. The second end 172 may be disposed opposite the first end 170. The second end 172 may also extend along a line or edge that may extend along an arc from the inner surface 142 to the outer surface 140 and may be coplanar with the first end 170. As such, the tip 150 may be disposed between the first connecting surface 152 and the second connecting surface 154 or between the first flank 156 and the second flank 158 when viewed along the axis 50. In addition, the tip 150 may be substantially planar and may be disposed substantially perpendicular to the axis 50 in one or more configurations. The tip 150 may be disposed at an end of each tooth 138 that may be disposed furthest away from a normal plane 162. The normal plane 162 may be a reference plane that may be disposed perpendicular to the axis 50 and may extend through the annular groove 134.

The first connecting surface 152 may extend from the first end 170 of the tip 150 to the first flank 156. As such, the first connecting surface 152 may extend in an axial direction away from the tip 150. In addition, the first connecting surface 152 may extend away from the second connecting surface 154. As such, the tooth 138 may become wider in an axial direction that extends away from the tip 150 to the first flank 156. The first connecting surface 152 may extend from the inner surface 142 to the outer surface 140. More specifically, the first connecting surface 152 may extend along a continuous convex curve or arc from the inner surface 142 to the outer surface 140 and may be continuously curved in a direction that extends from the inner surface 142 to the outer surface 140.

The second connecting surface 154 may be disposed opposite the first connecting surface 152. The second connecting surface 154 may extend from the second end 172 of the tip 150 to the second flank 158. As such, the second connecting surface 154 may extend in an axial direction away from the tip 150. In addition, the second connecting surface 154 may extend away from the first connecting surface 152. As such, the tooth 138 may become wider in an axial direction that extends away from the tip 150 to the second flank 158. Conversely, the first connecting surface 152 and the second connecting surface 154 may become progressively closer together and the tooth 138 may become narrower in an axial direction that extends from the first flank 156 and the second flank 158 toward the tip 150. The second connecting surface 154 may extend from the inner surface 142 to the outer surface 140. More specifically, the second connecting surface 154 may extend along a continuous concave curve or arc from the inner surface 142 to the outer surface 140 and may be continuously curved in a direction that extends from the inner surface 142 to the outer surface 140.

The first flank 156 may extend from the first connecting surface 152 to the root surface 160. More specifically, the first flank 156 may extend from an end of the first connecting surface 152 that is disposed opposite the tip 150 to the root surface 160. As such, the first connecting surface 152 may extend in an axial direction away from the first connecting surface 152. In addition, the first flank 156 may extend toward the second flank 158. As such, the tooth 138 may become narrower in an axial direction that extends away from the first connecting surface 152 and toward the root surface 160. The first flank 156 may extend from the inner surface 142 to the outer surface 140. More specifically, the first flank 156 may extend along a continuous convex curve or arc from the inner surface 142 to the outer surface 140 and may be continuously curved in a direction that extends from the inner surface 142 to the outer surface 140.

The second flank 158 may be disposed opposite the first flank 156. The second flank 158 may extend from the second connecting surface 154 to the root surface 160. More specifically, the second flank 158 may extend from an end of the second connecting surface 154 that is disposed opposite the tip 150 to the root surface 160. As such, the second connecting surface 154 may extend in an axial direction away from the second connecting surface 154. In addition, the second flank 158 may extend toward the first flank 156. As such, the tooth 138 may become narrower in an axial direction that extends from the second connecting surface 154 to the root surface 160. The second flank 158 may extend from the inner surface 142 to the outer surface 140. More specifically, the second flank 158 may extend along a continuous concave curve or arc from the inner surface 142 to the outer surface 140 and may be continuously curved in a direction that extends from the inner surface 142 to the outer surface 140.

Figure 8:
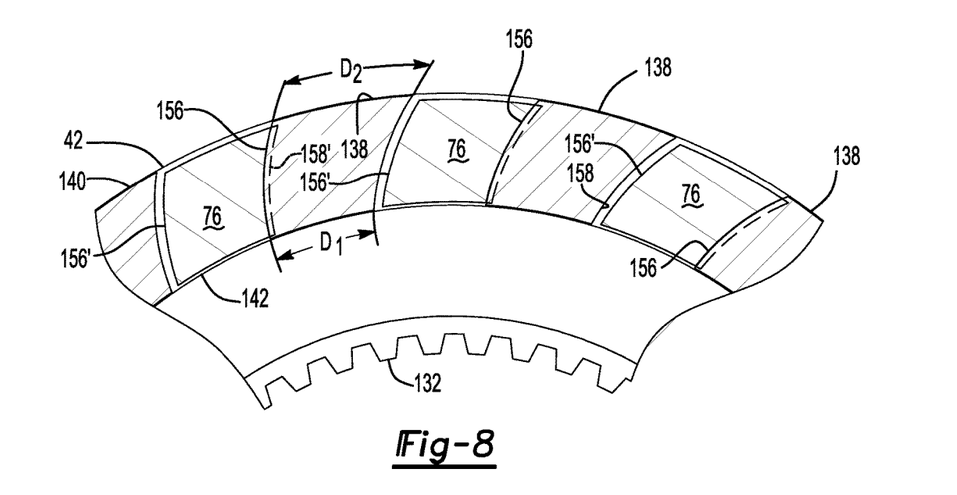
FIG. 8 is a section view along section line 8-8.

The first flank 156 and the second flank 158 may have the same configuration or different configurations. For example, the first flank 156 and the second flank 158 may have spiral configurations. As such, the first flank 156 and the second flank 158 may cooperate to form a spiral tooth profile between the first flank 156 and the second flank 158. In a parallel spiral configuration, the first flank 156 and the second flank 158 may be disposed substantially parallel to each other. Alternatively, the first flank 156 and the second flank 158 may have involute spiral configurations in which the first flank 156 may not be disposed parallel to the second flank 158. In such a configuration, the gap between adjacent teeth 138 or length of the root surface 160 between adjacent teeth 138 may increase in a direction that extends in a radial direction that extends away from the axis 50 as is best illustrated in FIG. 8. The distance from the first flank 156 of a first tooth to the second flank 158 of an adjacent second tooth along the inner surface 142 is designated $D_1$. The distance from the first flank 156 of the first tooth to the second flank 158 of the adjacent tooth along the outer surface 140 is designated $D_2$. $D_2$ may be greater than $D_1$ when the first flank 156 and the second flank 158 are not disposed parallel to each other or are provided with involute configurations.

Referring again to FIGS. 4 and 9, the root surface 160 may extend between adjacent teeth 138 of the clutch collar face gear 136. More specifically, the root surface 160 may extend from a first tooth to a second tooth that is disposed adjacent to the first tooth. The root surface 160 may extend from the inner surface 142 to the outer surface 140.

The root surface 160 may or may not have a planar configuration. For example, the root surface 160 may have a planar configuration that may be disposed substantially perpendicular to the axis 50 in substantially parallel to the normal plane. Alternatively, the root surface 160 may have a nonplanar configuration. An example of a nonplanar configuration is best described with reference to FIG. 4. In FIG. 4, the corners of the root surface 160 are labeled with letters A through D. Point A is located adjacent to the inner surface 142 and the first flank 156 of a first tooth. Point B is located adjacent to the outer surface 140 and the first flank 156 of the first tooth. Point C is located adjacent to the inner surface 142 and the second flank 158 of a second tooth. Point D is located adjacent to the outer surface 140 and the second flank 158 of the second tooth. Points A and D may be disposed closer to the normal plane 162 than points B and C. As such, the root surface 160 may be disposed further from the normal plane 162 where the first flank 156 of a tooth meets the outer surface (point B) than where the first flank 156 meets the inner surface 142 (point A). Similarly, the root surface 160 may be disposed further from the normal plane 162 where the first flank 156 of the first tooth meets the outer surface 140 (point B) than where the second flank 158 of the second tooth meets the outer surface 140 (point D). The root surface 160 may also be disposed further from the normal plane 162 where the second flank 158 of the tooth meets the inner surface 142 (point C) than where the second flank 158 of the tooth meets the outer surface 140 (point D). In such a configuration, the root surface 160 may be cupped or continuously curved to help distribute load forces.

Figure 10:
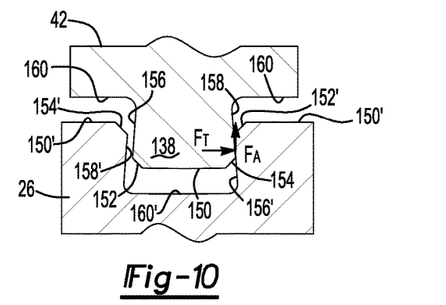

Referring to FIGS. 8-10, the teeth 76 of the face gear 72 may have the same configuration or a similar configuration as the teeth 138 of the clutch collar 42. As such, the features of the teeth 76 of the face gear 72 are designated with the same reference numbers as the teeth 138 of the clutch collar 42 and include an include an apostrophe (') when used to refer to features of the teeth 76 of the face gear 72. Thus, each tooth 76 of the face gear 72 may have a tip 150', a first connecting surface 152', a second connecting surface 154', a first flank 156', and a second flank 158'. In addition, a root surface 160' may extend between adjacent teeth 76 of the face gear 72.

The teeth 138 of the clutch collar face gear 136 may selectively engage the teeth 76 of the face gear 72 of the drive gear 26 depending on the position of the clutch collar 42.

Figure 5:
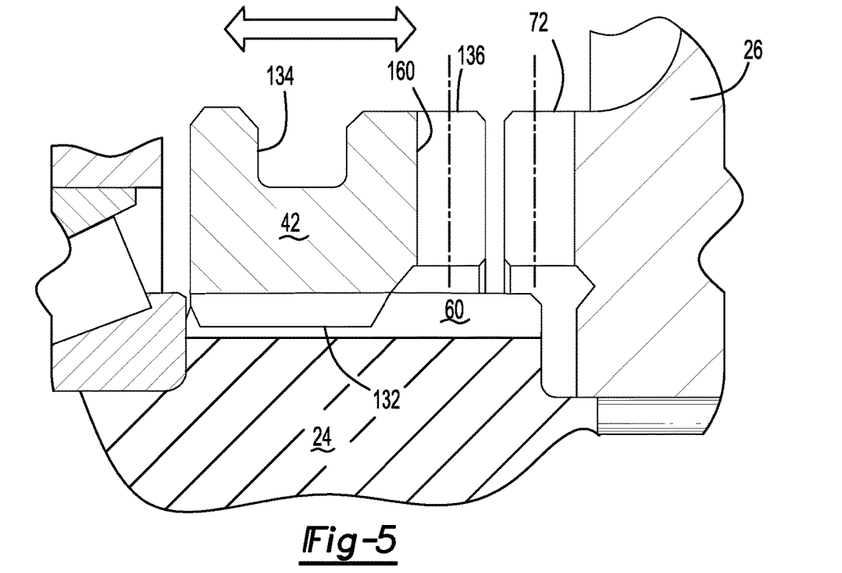
FIG. 5 is a magnified view of a portion of the drivetrain assembly shown in FIG. 3 with the clutch collar in a disengaged position.
Figure 6:
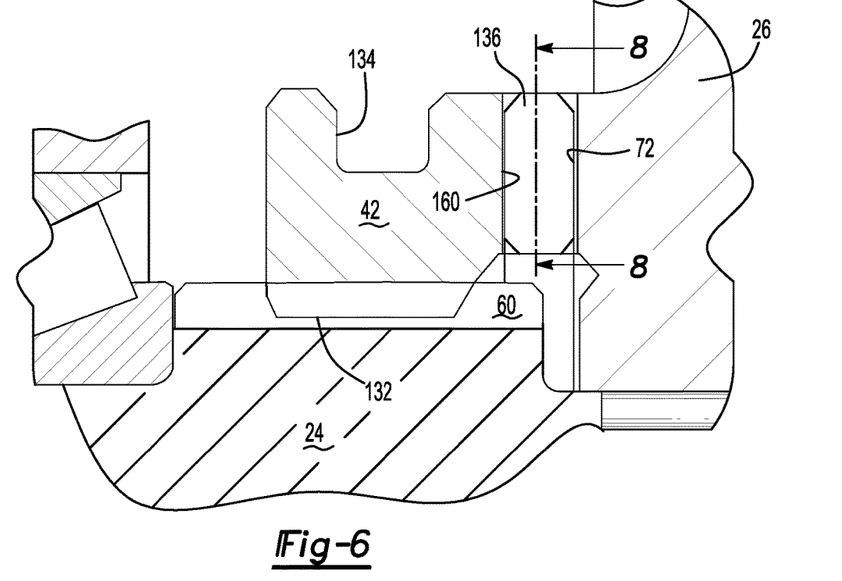
FIG. 6 is a magnified view of a portion of the drivetrain assembly with the clutch collar in an engaged position.
Figure 7:
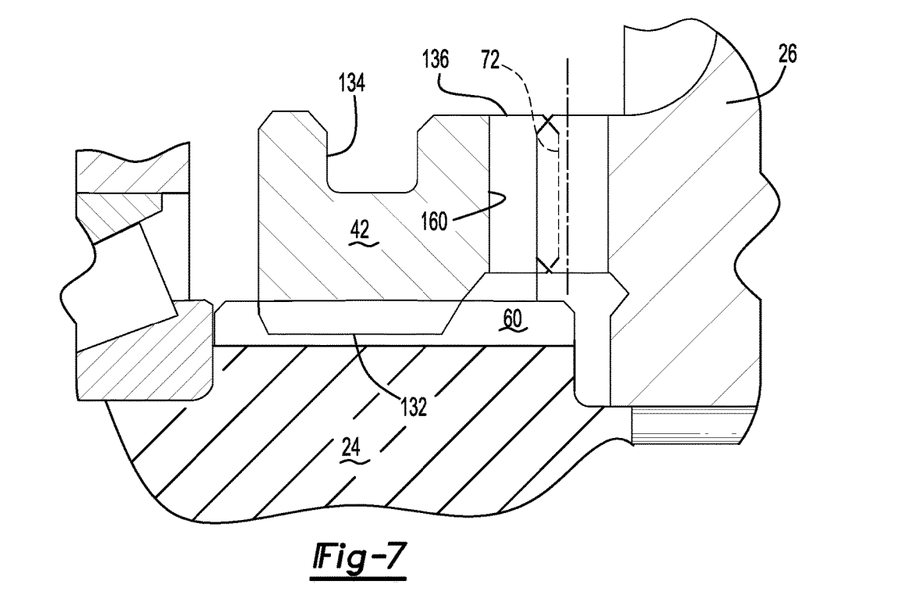
FIG. 7 is a magnified view of a portion of the drivetrain assembly with the clutch collar in a partially engaged position.

Referring to FIGS. 5-7, movement of the clutch collar 42 is shown in more detail. The clutch collar 42 may move between a disengaged position and an engaged position. An example of a disengaged position is shown in FIG. 5. An example of an engaged position is shown in FIG. 6. The clutch collar 42 may also be disposed in a partially engaged position that may be disposed between the disengaged position and the engaged position. An example of a partially engaged position is shown in FIG. 7. The clutch collar 42 may lock the interaxle differential unit 28 when the clutch collar 42 is in the engaged position or the partially engaged position such that the input shaft 24 and the output shaft 30 may not rotate at different velocities with respect to each other.

Referring to FIG. 5, the clutch collar 42 may be spaced apart from and may not engage a gear, such as the drive gear 26, when in the disengaged position. As such, the clutch collar face gear 136 may not engage and mate with the face gear 72. As a result, the clutch collar and shaft that is received in the clutch collar may be free to rotate at a different velocity than the component having the face gear. In the example shown, the input shaft 24 and the output shaft 30 may be free to rotate at different velocities with respect to each other by way of operation of the interaxle differential unit 28.

Referring to FIGS. 6 and 9, the clutch collar 42 may be actuated in an axial direction against the drive gear 26 when in the engaged position. More specifically, the clutch collar 42 may be actuated such that the tip 150 of the teeth 138 of the clutch collar 42 engage the root surface 160' of the face gear 72, the tip 150' of the teeth 76 of the face gear 72 engage the root surface 160 of the clutch collar 42, or both. In addition, the clutch collar face gear 136 may engage and mesh with the face gear 72. The second flank 158 of each tooth 138 of the clutch collar 42 may engage the first flank 156' of a corresponding tooth 76 of the face gear 72. The second flank 158 may engage the first flank 156' such that there is full contact or continuous engagement with no gap between the second flank 158 and the first flank 156'. Full contact or continuous engagement may help distribute load forces and avoid contact along a line or at a single point. As such, the drive gear may rotate around the axis 50 with the clutch collar 42 and the shaft when the set of teeth 76 of the face gear 72 are received between members of the set of clutch collar teeth 138 and the first flank 156' of each member of the set of teeth 76 is in continuous engagement with the second flank 158 of a corresponding member of the set of clutch collar teeth 138.

Referring to FIG. 9, the dovetail configuration of the flanks may produce a negative pressure angle that may inhibit disengagement of the clutch collar 42 from the drive gear 26. The second flank 158 may engage and exert force on the first flank 156' due to rotation of the input shaft and the clutch collar 42. A portion of the force may be exerted axially or in a direction that may extend substantially parallel to the axis 50 as represented by force vector $F_a$ and a portion of the force may be exerted in a direction that may be disposed perpendicular to force vector $F_a$ as represented by force vector $F_t$. Force vector $F_a$ may extend toward the first flank 156' of the drive gear 26 and may help hold the clutch collar 42 in the engaged position. Force vector $F_t$ may generally extend in a direction of rotation of the input shaft 24 about the axis 50 and may represent rotational force that may be exerted by the input shaft 24 on the clutch collar 42. This force may be transmitted to the face gear 72 to cause the clutch collar 42 and another component, such as the drive gear 26, to rotate with the input shaft 24.

Referring to FIGS. 7 and 10, the clutch collar 42 is shown in a partially engaged position. The teeth 138 of the clutch collar 42 may engage the teeth 76 of the face gear 72 but corresponding tips and root surfaces may be spaced apart from each other and may not be engaged. More specifically, the tip 150 of the teeth 138 of the clutch collar 42 may be spaced apart from the root surface 160' of the face gear 72 and the tip 150' of the teeth 76 of the face gear 72 may be spaced apart from the root surface 160 of the clutch collar 42. The second flank 158 of each tooth 138 of the clutch collar 42 may engage the first flank 156' of a corresponding tooth 76 of the face gear 72. The second flank 158 may engage the first flank 156' such that there is full contact or no gap between the second flank 158 and the first flank 156'.

Referring to FIG. 10 the dovetail configuration of the flanks may produce a negative pressure angle that may inhibit the clutch collar 42 from disengaging the drive gear 26 as previously discussed. Moreover, the teeth 138 of the clutch collar 42 and the teeth 76 of the face gear 72 may engage with full contact and a negative pressure angle when in a partially engaged position.

The combination of full contact and a negative pressure angle is not realized using other tooth configurations that lack the combination of spiral teeth and a dovetail profile. For instance, flat or straight teeth will engage with point contact or line contact when in a partially engaged position. Such point contact or line contact concentrates load forces near or at where a flank meets the inner surface. This in turn may cause cracking of the teeth of the face gear, teeth of the clutch collar, or both thereby reducing durability and product life.

Referring to FIGS. 11-13b, manufacturing of teeth will now be described in greater detail. Manufacturing will be described primarily in the context of providing teeth on a clutch collar; however, it is contemplated that the same manufacturing steps may be employed to provide teeth on another component that mates with the clutch collar teeth (i.e., a component that has the face gear).

Figure 11:
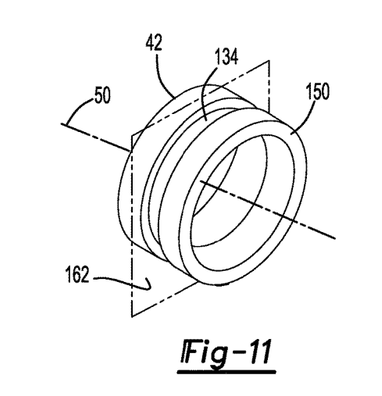
FIG. 11 shows an annular body of the clutch collar before cutting the clutch collar teeth.

Referring to FIG. 11, an annular body of a clutch collar 42 is shown prior to cutting the clutch collar gear teeth. In such a configuration, a tip 150 may initially extend continuously around the axis 50 and the clutch collar hole 130.

Figure 12A:
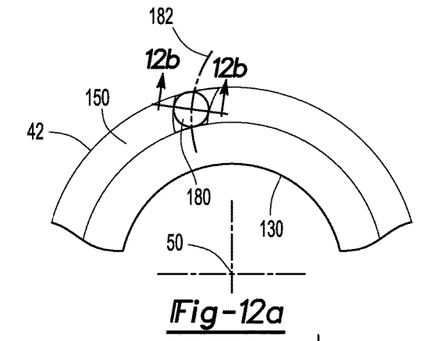
FIGS. 12a and 12b show a first cutting tool removing material from the clutch collar.
Figure 12B:
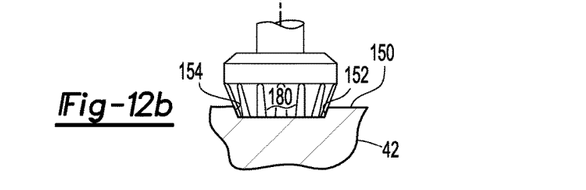

Referring to FIGS. 12a and 12b, removal of material with a first cutting tool 180 is shown. The first cutting tool 180 may remove material from the tip 150 to begin to define the teeth. More specifically, the first cutting tool 180 may remove material from the tip 150 to form the first connecting surface 152 of a first tooth 138 and the second connecting surface 154 of a second tooth 138. The first cutting tool 180 may move along a first tool path 182, such as an arcuate tool path or a spiral tool path, in a direction that either extends toward or away from the axis 50.

Figure 13A:
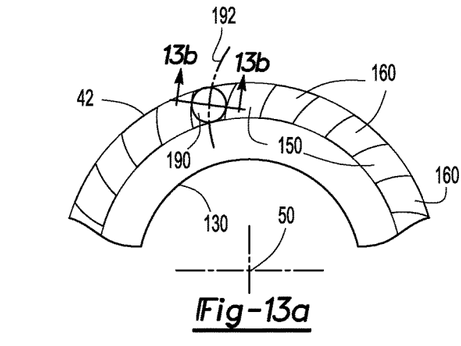
FIGS. 13a and 13b show a second cutting tool removing material from the clutch collar.
Figure 13B:
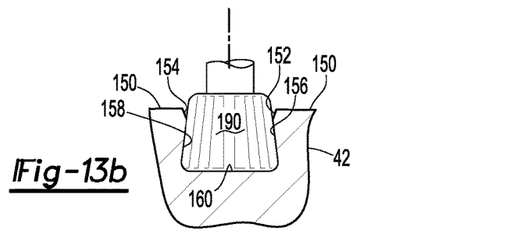

Referring to FIGS. 13a and 13b, removal of material with a second cutting tool 190 is shown. The second cutting tool 190 may remove additional material to further define the teeth and form the dovetail opening between adjacent teeth 138. More specifically, the second cutting tool 190 may remove material to form the first flank 156 of the first tooth 138, the second flank 158 of the second tooth 138, and the root surface 160. The second cutting tool 190 may move along a second tool path 192 when removing material. The second tool path 192 may be an arcuate tool path and may be the same as or similar to the first tool path 182 when viewed along the axis 50; however, the second cutting tool 190 may remove material at a greater depth than the first cutting tool 180.

It is also contemplated that some or all of the functionality of the first cutting tool 180 and the second cutting tool 190 may be combined. For example, a first cutting tool may be configured to remove material to form the first connecting surface 152 in the first flank 156 while a second cutting tool may be configured to remove material to form the second connecting surface 154 and the second flank 158. As another example, a cutting tool may be configured to remove material to form the first connecting surface 152, the second connecting surface 154, the first flank 156, and the second flank 158. It is also contemplated that the first cutting tool 180 may form the first connecting surface 152 and the second connecting surface 154, a second cutting tool may form the first flank 156, and a third cutting tool may form the second flank 158. Using different cutting tools to form the first flank 156 and the second flank 158 may provide better control over the tooth flank geometry.

The tooth configurations discussed above may be easier and less expensive to manufacture than other gear teeth designs, such as Curvic Coupling teeth or teeth with a twisted tooth surface profile. Curvic coupling teeth have complex configurations that require dedicated and expensive cutting tools and expensive machine tools with specialized software for manufacture. Five axis CNC (computer numerical control) machine tools must be used to manufacture teeth with a twisted surface profile as opposed to less expensive three axis CNC machine tools that may be used to provide the teeth associated with the present invention. Moreover, the present invention may be manufactured such that a tool may cut the connecting surfaces or flanks of adjacent teeth at the same time as opposed to cutting each surface or flank independently, which may reduce cycle time and manufacturing cost.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A clutch collar comprising:
an outer surface that extends around an axis;
an inner surface that is disposed opposite the outer surface;
a clutch collar face gear that has a first tooth and a second tooth that extend from the inner surface to the outer surface, wherein the first tooth includes:
a first flank that is continuously curved in a direction that extends from the inner surface to the outer surface; and
a second flank that is disposed opposite the first flank and is continuously curved in the direction that extends from the inner surface to the outer surface;
a root surface extends from the first tooth to the second tooth and from the inner surface to the outer surface, wherein the root surface is nonplanar and is disposed further from a normal plane where the first flank of the first tooth meets the outer surface than where a second flank of the second tooth meets the outer surface; and
an annular groove that is spaced apart from the clutch collar face gear and extends from the outer surface toward the axis, wherein the normal plane is disposed in the annular groove and is disposed perpendicular to the axis;
wherein the first tooth has a dovetail profile in which the first flank and the second flank become progressively further apart in an axial direction that extends away from the annular groove.

2. The clutch collar of claim 1 wherein the first flank is convex from the inner surface to the outer surface.

3. The clutch collar of claim 2 wherein the second flank is concave from the inner surface to the outer surface.

4. The clutch collar of claim 1 wherein the first flank and the second flank have spiral configurations.

5. The clutch collar of claim 1 wherein the first flank and the second flank have involute configurations.

6. The clutch collar of claim 1 wherein the first flank is not disposed parallel to the second flank and a first distance from the first flank to the second flank along the inner surface is less than a distance from the first flank to the second flank along the outer surface.

7. The clutch collar of claim 1 wherein the first tooth has a tip that extends from the inner surface to the outer surface and is disposed between the first flank and the second flank, wherein the tip is disposed substantially perpendicular to the axis.

8. The clutch collar of claim 7 further comprising a first connecting surface and a second connecting surface that extend from the inner surface to the outer surface, wherein the first connecting surface extends from the first flank to a first end of the tip and the second connecting surface extends from the second flank to a second end of the tip that is disposed opposite the first end, wherein the first connecting surface and the second connecting surface become progressively closer together in the axial direction.

9. The clutch collar of claim 8 wherein the second tooth has the same configuration as the first tooth.

10. The clutch collar of claim 9 wherein the root surface is disposed further from the normal plane where the first flank of the first tooth meets the outer surface than where the first flank of the first tooth meets the inner surface.

11. The clutch collar of claim 10 wherein the root surface is disposed further from the normal plane where the second flank of the first tooth meets the inner surface than where the second flank of the second tooth meets the outer surface.

12. A drivetrain assembly comprising:
a shaft that has a spline and is rotatable about an axis;
a gear that receives the shaft and is rotatable about the axis with respect to the shaft, the gear having a face gear that has a set of teeth that are arranged around the axis, wherein each member of the set of teeth has a first flank and a second flank that are continuously curved in a direction that extends away from the axis;
a clutch collar that is moveably disposed on the shaft, the clutch collar having a clutch collar hole that receives the shaft, a clutch collar spline that is disposed in the clutch collar hole and that mates with the spline to inhibit rotation of the clutch collar with respect to the shaft, and a clutch collar face gear that has a set of clutch collar teeth, wherein each member of the set of clutch collar teeth has a first flank and a second flank that are continuously curved in a direction that extends away from the axis and the first flank and the second flank extend from an inner surface of the clutch collar that faces toward the axis, wherein at least a portion of the inner surface extends continuously around the axis, and a set of root surfaces that is provided between adjacent members of the set of clutch collar teeth, wherein each member of the set of root surfaces extends from the first flank of a member of the set of clutch collar teeth to a second flank of an adjacent member of the set of clutch collar teeth and from the inner surface to an outer surface that is disposed opposite the inner surface, is nonplanar, and is disposed further from a normal plane where the first flank of the member of the set of clutch collar teeth meets the outer surface than where a second flank of the adjacent member of the set of clutch collar teeth meets the outer surface, wherein the normal plane is disposed in an annular groove that is spaced apart from the clutch collar face gear and is disposed perpendicular to the axis;

wherein the set of teeth have a first dovetail profile in which the first flank and the second flank become progressively further apart in an axial direction that extends toward the clutch collar, the set of clutch collar teeth have a second dovetail profile in which the first flank and the second flank become progressively further apart in an axial direction that extends toward the gear.

13. The drivetrain assembly of claim 12 wherein the gear rotates around the axis with the clutch collar and the shaft when the set of teeth of the face gear are received between members of the set of clutch collar teeth such that the first flank of each member of the set of teeth is in continuous engagement with the second flank of a corresponding member of the set of clutch collar teeth.

14. The drivetrain assembly of claim 13 wherein the second flanks of the members of the set of teeth is spaced apart from and do not engage the first flanks of the members of the set of clutch collar teeth when the gear rotates around the axis with the clutch collar and the shaft.

15. The drivetrain assembly of claim 13 wherein the first flank of each member of the set of teeth is convex and the second flank of each member of the set of clutch collar teeth is concave.

16. The drivetrain assembly of claim 15 wherein the first flank of each member of the set of clutch collar teeth is convex and the second flank of each member of the set of teeth is concave.

17. The drivetrain assembly of claim 13 wherein teeth of the face gear and teeth of the clutch collar face gear mesh with a negative pressure angle to inhibit disengagement of the clutch collar from the gear.

* * * * *